United States Patent [19]

Morita et al.

[11] Patent Number: 5,524,002
[45] Date of Patent: Jun. 4, 1996

[54] DISC REPRODUCTION APPARATUS

[75] Inventors: Hideji Morita; Norihiro Kurokawa; Yoshifusa Fujioka, all of Hiroshima-ken, Japan

[73] Assignee: Sharp Kabushiki Kaisha, Osaka, Japan

[21] Appl. No.: 219,272

[22] Filed: Mar. 29, 1994

[30] Foreign Application Priority Data

Jun. 10, 1993 [JP] Japan .................... 5-138446

[51] Int. Cl.⁶ .................... G11B 17/08; G11B 17/22
[52] U.S. Cl. .................... 369/191; 369/36
[58] Field of Search .................... 369/191, 192, 369/193, 194, 178, 34, 36, 38, 178; 360/92, 98.01–98.02; 312/9.47, 9.56, 9.58, 9.61, 111; 206/308.3, 309, 512

[56] References Cited

U.S. PATENT DOCUMENTS

| | | | |
|---|---|---|---|
| 5,001,582 | 3/1991 | Numasaki | 369/36 |
| 5,210,729 | 5/1993 | Schmidt et al. | 369/36 |
| 5,291,990 | 3/1994 | Sejzer | 206/308.3 |

FOREIGN PATENT DOCUMENTS

| | | | |
|---|---|---|---|
| 87103811 | 12/1987 | China . | |
| 0138005 | 4/1985 | European Pat. Off. . | |
| 0420350 | 4/1991 | European Pat. Off. | 206/309 |
| 2168444 | 8/1973 | France . | |
| 3603383 | 8/1987 | Germany | 312/9.58 |
| 4101693 | 7/1992 | Germany | 369/191 |
| 60-52951 | 3/1985 | Japan . | |
| 3-83262 | 4/1991 | Japan . | |
| 4-10274 | 1/1992 | Japan . | |
| 0822305 | 10/1959 | United Kingdom | 312/9.58 |

*Primary Examiner*—Stuart S. Levy
*Assistant Examiner*—Allen Cao

[57] ABSTRACT

A disc reproduction apparatus includes a disc reproduction assembly and a tray accommodating unit positioned at either side of the disc reproduction assembly on the upper face of a main body of the apparatus. A disc tray group including a plurality of disc trays sequentially connected in series by a joint is provided in a movable manner between the tray accommodating units at either side of the disc reproduction assembly. In accordance with the travel of the disc tray group, one disc tray is selectively positioned in the disc reproduction assembly and the remaining disc trays are stored in the tray accommodating units. According to this structure, the number of loadable discs can be increased without unduly increasing the size of the entire apparatus and the complexity of the selecting mechanism.

17 Claims, 13 Drawing Sheets

DISC REPRODUCTION APPARATUS

BACKGROUND OF THE INVENTION

1. Field of the Invention

The present invention relates to disc reproduction apparatuses, and more particularly, to a disc reproduction apparatus including a disc changer function that can have a plurality of discs loaded for sequentially selecting a desired disc for reproduction.

2. Description of the Background Art

Conventional disc reproduction apparatuses with a disc changer function are already proposed such as a disc reproduction apparatus with the so-called roulette type disc changer (refer to Japanese Patent Laying-Open No. 4-10274, for example) that has a plurality of discs mounted annularly on a round disc table, wherein a desired disc is transferred for reproduction to a disc reproduction assembly by a clockwise or counterclockwise rotation of the disc table, or a disc reproduction apparatus with the so-called stacker type disc changer (refer to Japanese Patent Laying-Open No. 3-83262, for example) that selects a desired disc out of a plurality of discs accommodated in a stacker at a predetermined pitch by moving the stacker vertically, whereby the selected disc is chucked by a disc moving means to be transferred to a disc reproduction assembly for reproduction.

The above-described roulette type disc changer had a problem that an increase in the loaded number of discs will increase the diameter of the disc table in proportion to the increased number to significantly increase the size of the apparatus. In order to avoid increase in the size of the apparatus, the number of discs that can be loaded was limited.

In the above-described stacker type disc changer, increase in the thickness of the stacker itself can be suppressed even if the loadable number of discs was increased since discs are accommodated in a stacked manner at a predetermined pitch. However, this type requires a complex operation of moving the stacker vertically for selecting a disc, taking out the selected disc from the stocker, and transferring the disc to the disc reproduction assembly. In order to realize this complex operation, the mechanism becomes complicated with increase in weight of the apparatus.

Furthermore, a disc reproduction apparatus including the above-described two types of disc changer had a problem at set forth in the following when combined with a portable radio cassette tape recorder. In the case of a roulette type disc changer, the disc table becomes too large with respect to the size of the main body of the radio cassette tape recorder. This becomes a bottleneck makes the realization of such a combination difficult. In the case of a stocker type disc changer, such a combination will increase the weight in accordance with the increase of the complexity of the structure, thereby degrading its portability. It is therefore not adaptable for combination with an apparatus that requires portability such as a radio cassette tape recorder.

Japanese Patent Laying-Open No. 60-52951 discloses a disc reproduction apparatus including a draw out mechanism wherein a disc accommodation unit is provided at either side of a disc reproduction assembly for drawing out a disc from the disc accommodation unit, and a disc transport mechanism to move the draw out mechanism vertically for transferring a disc between the disc reproduction assembly and a draw out position in the disc accommodation unit. The apparatus described in this application includes a facility having a disc accommodation unit provided at the rear side of the disc reproduction assembly for transporting one disc selectively to the disc reproduction assembly.

This disc reproduction apparatus had a problem that the size is increased at the upper portion of the disc reproduction assembly to ensure the vertical movement of the disc transport mechanism. There was also the disadvantage of the structure of the disc transportation mechanism and the draw out mechanism becoming complex.

There was also the following disadvantage during the designing stage. In order to exchange a reproduction disc in the apparatus of the above application, first a disc after reproduction is transported to the former accommodated position by the transportation mechanism. That disc is accommodated in a predetermined position in the disc accommodation unit by the draw out mechanism. Then, the transportation mechanism is transported to a predetermined position of the next disc to be reproduced, whereby the disc is drawn out from the disc accommodation portion by a draw out mechanism to be transported to the disc reproduction assembly. Such an operation of disc exchange was time consuming. Furthermore, control of each mechanism in the disc exchange operation was increased in complexity to induce disadvantage in designing.

SUMMARY OF THE INVENTION

An object of the present invention is to provide a disc reproduction apparatus including a disc changer that can have the loadable number of discs increased without increasing the size of the entire apparatus and the complexity of the select mechanism.

A disc reproduction apparatus of the present invention for achieving the above object includes an apparatus main body having a disc reproduction assembly for reproducing a disc and a tray accommodation unit located at either side of the disc reproduction assembly, a disc tray group having a plurality of disc trays sequentially connected in series so that adjacent disc trays are relatively rotatable and movable with each other, a disc tray driving device for moving the disc tray group in the connected direction of the disc tray, and a tray travel guiding member. The tray travel guiding member serves to guide the travel of each disc tray to selectively position one disc tray at the disc reproduction assembly and to position the remaining disc trays in the tray accommodation unit at the travel of the disc tray group.

According to the disc reproduction apparatus, a desired disc is selected and transported to the disc reproduction assembly for reproduction by moving the disc tray group in the connected direction of the disc trays. Selective reproduction of a disc is carried out by a very simple operation. Furthermore, a disc table such as one required in a roulette type disc changer can be eliminated. Therefore, the problem of increase in weight due to complex mechanism and increase in size of the apparatus due to usage of a disc table can be eliminated. Therefore, combination with a portable radio cassette tape recorder is enabled in a favorable manner.

According to a preferable embodiment of a disc reproduction apparatus of the present invention, the tray travel guiding member of the above-described structure includes a horizontal travel guiding member for moving a disc tray substantially in a horizontal manner between the pair of tray accommodation units sandwiching the disc reproduction assembly, and a vertical travel guiding member for moving vertically the disc tray in the tray accommodation unit while maintaining its substantial horizontal state.

According to the above-described structure, disc trays can be accommodated in a stacked up manner each maintaining its horizontal state in the tray accommodating unit. Therefore, increase in the size of the main body of the apparatus according to increase in the loadable number of discs can be minimized. Also, the stability of the maintained manner of a disc in the tray accommodating unit is increased.

According to a further preferable embodiment of a disc reproduction apparatus of the present invention, the vertical travel guiding member of the above-described embodiment includes an inclined guiding path that inclines in a direction gradually farther away from the disc reproduction assembly as towards the lower end, wherein a disc tray conveyed from the disc reproduction assembly to the tray accommodating unit by the horizontal travel guiding member is moved downwards obliquely. According to this structure, transportation of each disc tray between the disc reproduction assembly and the tray accommodating unit is carried out smoothly.

According to the above-described preferable embodiment, either end in the travel direction of each disc tray is formed in a semicircular shape. By a joint provided with a pair of shaft portions having a pitch substantially equal to the diameter of the semicircular shape, adjacent disc trays are connected so that respective peripheries of the semicircular edge portions can be brought into contact with each other. Furthermore, a groove is formed at both side surfaces of at least each of disc trays located amidst the disc tray group, extending in the travel direction of the disc tray and into which the leg of the joint fits slidably.

According to the above structure, the peripheries of the semicircular edge portions of adjacent disc trays can come into contact with each other. Therefore, change of the travel direction for each disc tray is carried out smoothly with no rattle or collision of the disc trays caused by a gap therebetween. Thus, travel of the disc tray group is carried out in a preferable manner.

According to the above preferable embodiment, the tray driving device can move the disc tray group by applying a driving force to the disc tray positioned in the disc reproduction assembly. According to this structure, the entire disc tray group can be moved smoothly by just applying a driving force to the disc tray located at the disc reproduction assembly. Thus, a simple mechanism can be employed that operates by a single driving source.

According to a further preferable embodiment of a disc reproduction apparatus of the present invention, the vertical travel guiding member of the above-described embodiment includes first and second inclining guiding paths. The first inclined guiding path has an upper end at the boundary of the disc reproduction assembly and the tray accommodating unit to regulate the movement of a joint in moving a disc tray from a disc reproduction assembly to a tray accommodating unit. The movement of the joint is altered downwards to guide a downward movement. The second inclined guiding path is provided parallel to the first inclined guiding path, and spaced apart from the boundary of the disc reproduction assembly and the tray accommodating unit, so that a guiding projection contributing to the horizontal movement of a disc tray is fitted thereto.

According to the above-described structure, the moving direction of a disc tray can be altered smoothly using a joint. Particular measures for altering the direction of movement is not required.

Preferably, the first and second inclined guiding paths have a groove-like configuration, wherein the width in the horizontal direction of the first inclined guiding path is substantially two times the diameter of the semicircular engaging portion of the joint that fits into the inclined guiding path. The width in the horizontal direction of the second inclined guiding path is substantially equal to the width of the guiding projection of the disc tray. Each of the disc trays located at the leftmost and rightmost sides in the disc tray group is provided with an engaging projection adjacent to the semicircular engaging portion of the joint, and has a diameter substantially equal to the diameter of the semicircular engaging portion.

According to the above structure, a disc tray can be moved vertically while maintaining its horizontal state owing to the inclination of the inclined guiding path and the semicircular engaging portion of the joint. Thus, a disc can be held stably, and the disc tray group can be moved smoothly.

According to still another preferable embodiment of the disc reproduction apparatus of the present embodiment, an open-close member is provided for opening/closing the upper face of the disc reproduction assembly and the tray accommodating unit. According to this structure, the upper faces of the disc reproduction assembly and the tray accommodating unit can be opened to effectively carry out loading and unloading of a disc in a disc tray.

According to another aspect of the present invention, a disc reproduction apparatus includes a main body having a disc reproduction assembly for reproducing a disc and a tray accommodating unit positioned at both sides of the disc reproduction assembly, a plurality of disc trays for mounting a disc, and a tray driving device for moving a disc tray between the tray accommodating units through the disc reproduction assembly for selectively positioning a disc tray in the disc reproduction assembly. Each disc tray moves in a substantially horizontal manner while adjacent disc trays are always in contact or adjacent to each other. The disc trays are accommodated in the tray accommodating unit in a stacked manner.

According to the above structure, a disc transportation mechanism or a draw out mechanism is not necessary. Therefore, room for the provision for these mechanism is no longer required to facilitate reduction in the size of the apparatus. Movement of a disc tray for exchanging a disc is carried out by repeating an operation of moving a disc tray on which a disc already played is mounted from the disc reproduction assembly to one tray accommodating unit, and an operation coupled with this operation for drawing out a subsequent disc tray from the other tray accommodating unit to move the same to the disc reproduction assembly. The time required for exchanging a disc can be reduced. Furthermore, the operation thereof becomes very simple to facilitate the control. Therefore, a structure of a disc reproduction apparatus can be realized that is significantly advantageous from the point of design.

According to another aspect of the present invention, a disc reproduction apparatus is characterized in that, in operating the tray driving device, the disc tray of the next order in one tray accommodating unit is brought to the top most position in accordance with the disc at the top most position in that tray accommodating unit moved to the disc reproduction assembly.

According to this structure, a compact disc reproduction apparatus can be obtained, similar to the disc reproduction apparatus of the above another aspect. Because the next disc tray is moved in accordance with the disc tray in the tray accommodating unit moved to the disc reproduction assembly, movement of the disc trays can be carried out sequentially and effectively. Thus, the time required for exchanging a disc can be reduced.

According to a preferable embodiment of a disc reproduction apparatus of the above structure, the tray accommodating unit accommodates a plurality of disc trays sequentially stacked in a vertical manner. The top most disc tray is transported to the disc reproduction assembly and the disc tray from the disc reproduction assembly is placed at the top most position.

According to this structure, the thickness of the tray accommodating unit can be minimized. Also, the movement of a disc tray between the tray accommodating unit and the disc reproduction assembly can be carried out smoothly.

According to another aspect of a disc reproduction apparatus of the present invention, each disc tray is moved substantially in a horizontal state with neighboring disc trays always contact with each other or in adjacent to each other. The disc trays are accommodated in a stacked state in the tray accommodating unit. According to this structure, the dimension, particularly the width dimension of the apparatus, can be minimized. Therefore, the size of the apparatus can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
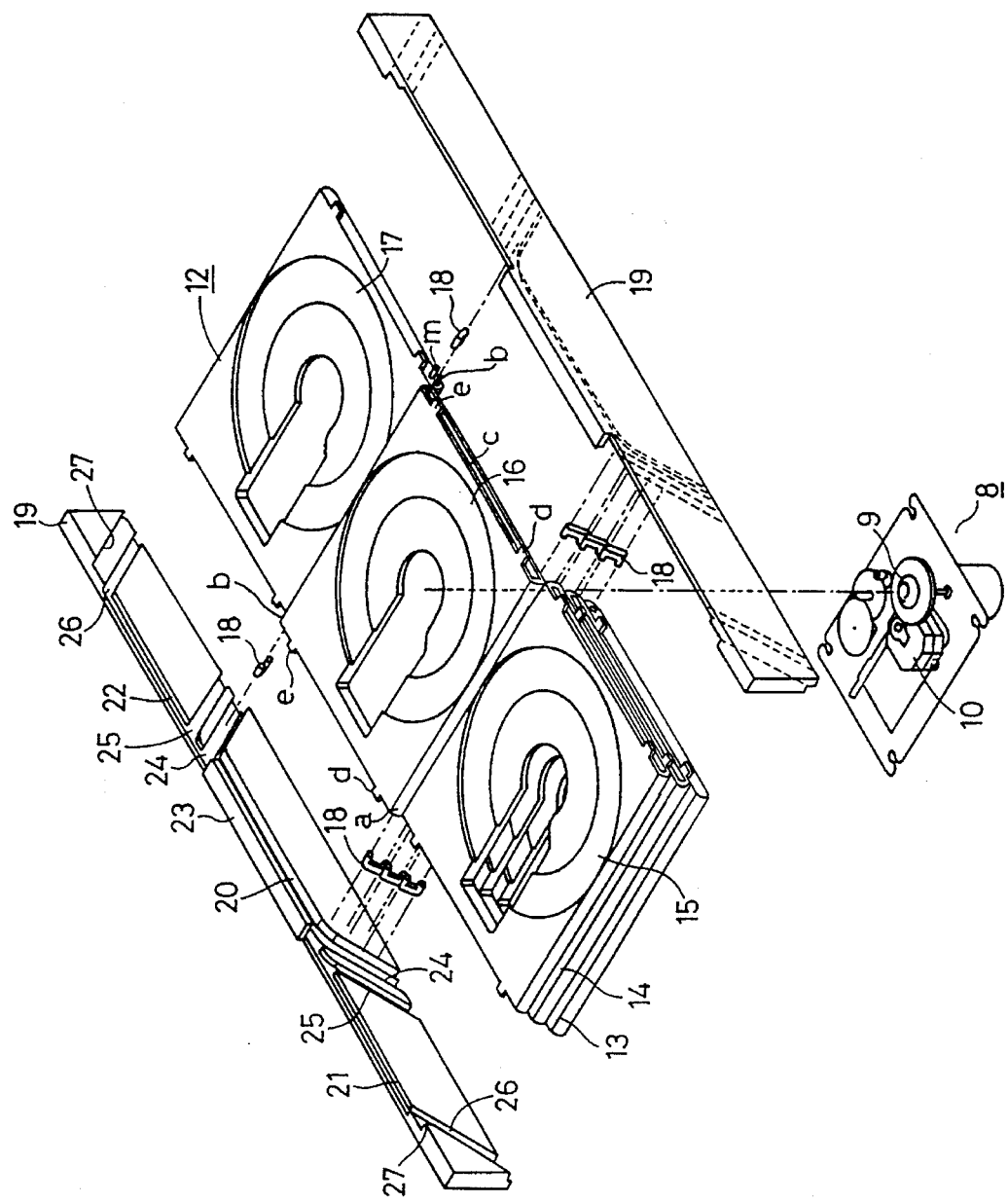
FIG. 1 is a perspective diagram showing the appearance of a disc reproduction apparatus according to the embodiment of the present invention with the cover open.

An embodiment of the present invention will be described hereinafter with reference to the drawings. Referring to FIGS. 1–7, a disc reproduction apparatus of the present embodiment has a structure as set forth in the following. A main body 1 of the apparatus includes a disc reproduction assembly 2 at the upper portion thereof, and tray accommodating units 3 and 4 located at either side of disc reproduction assembly 2. Cover members 5–7 that can be opened/closed are provided at the upper openings of disc reproduction assembly 2, tray accommodating unit 3, and tray accommodating unit 4, respectively. In disc reproduction assembly 2, a reproduction unit 8 is provided including a turntable 9 on which a disc is loaded and an optical pickup 10 for reading information from a disc. Reproduction unit 8 moves downwards to a turnout position when a disc tray group that will be described afterwards travels, and moves upwards to a play position when a desired disc tray is positioned in disc reproduction assembly. Reproduction unit 8 at a play position holds a disc in a stable manner by lifting up a disc from a disc tray by turntable 9 to sandwich a disc between a stabilizer 11 provided at the inner face of cover member 5 and turntable 9.

Because the vertical travel mechanism of reproduction unit 8 is well known and is not directly related to the present invention, further detail of reproduction unit 8 will be omitted.

In main body 1 of the disc reproduction apparatus, a disc tray group 12 is provided in a movable manner including a plurality of disc trays connected in series. Disc tray group 12 is movable between tray accommodating units 3 and 4 disposed so as to sandwich disc reproduction assembly 2.

Each of cover members 5–7 can be opened/closed individually above disc reproduction assembly 2, and tray accommodating units 3 and 4, respectively. Therefore, loading and unloading of a disc can be carried out at the top most disc tray in respective tray accommodating units 3 and 4 even during reproduction of a disc.

It is possible to attach a stabilizer 11 to a standable arm provided at the main body of the apparatus instead of stabilizer 11 attached to cover member 5. Such a structure allows disc exchange in tray accommodating units 3 and 4 during reproduction of a disc even if the tops of disc reproduction assembly 2 and tray accommodating units 3 and 4 are opened/closed by one common cover body.

Disc tray group 12 of the present embodiment has five disc trays 13–17 sequentially connected in series. Discs differing in diameter, for example, a compact disc of 12 cm in diameter and a compact disc of 8 cm in diameter can be loaded in respective disc trays 13–17.

Each of disc trays 13–17 has either end (the leading and trailing ends) in the tray connected direction (travel direction) formed in a semicircular configuration. For the sake of simplifying the descriptions, left and right peripheries of the semicircular edge portions of each of disc trays 13–17 are referred to as a left semicircular face a and a right semicircular face b, respectively.

Each side surface of the three disc trays 14–16 which are the intermediate disc trays in disc tray group 12 has a groove c formed extending in the tray connected direction. Both ends of each groove c has a semicircular periphery concentric with left or right semicircular faces a or b. At the upper edge portion of either side of each of disc trays 13–17, a pair of guide projections d and e are provided with a predetermined distance therebetween in the tray connected direction. The edge portions of guide projections d and e are chamfered to form an inclining surface. The back side of each of disc trays 13–17 has a rack f formed extending linearly in the tray connected direction.

Figure 11A:
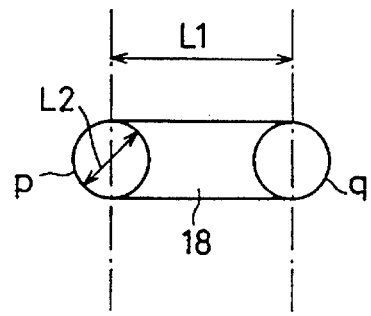
FIGS. 11A and 11B are enlarged front and plan views of a joint in the disc reproduction apparatus.
Figure 11B:
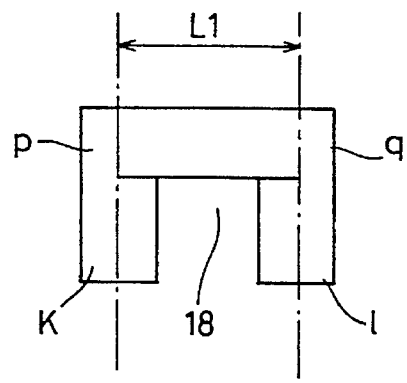

Each of disc trays 13–17 is connected by a joint 18 so that neighboring disc trays are relatively rotatable and slidable with each other. Joint 18 includes a pair of columnar projections (stem) k and l, as will be described afterwards with reference to FIGS. 11A and 11B. Connection among the inner disc trays 14–16 of disc tray group 12 is carried out by fitting each of columnar projections k and l into respective grooves c of adjacent disc trays. Connection between disc trays 13 and 17 located at either end of disc tray group 12 and disc trays 14 and 16 is carried out by fitting one of columnar projections k or l of joint 18 into each groove c of disc trays 14 and 16, and the other columnar projection k or l being pivoted rotatably to the end of disc trays 13 and 17.

The pivot position of columnar projection k or l of joint 18 in disc trays 13 and 17 coincide with the center point of right or left semicircular faces a or b of disc trays 13 and 17. A columnar engaged projection m is provided adjacent to the pivoted columnar projections k and l.

A tray travel guiding member for guiding the movement of each of disc trays 13–17 to transport disc tray group 12 above tray accommodating units 3 and 4 will be described hereinafter.

The tray travel guiding member includes a horizontal travel guiding member for moving each of disc trays 13–17 horizontally, and a vertical travel guiding member. Disc trays 13–17 carried to a position above tray accommodating units 3 and 4 by the horizontal travel guiding member is moved downwards obliquely while maintaining a horizontal state by the vertical travel guiding member.

The horizontal travel guiding member is located across the width of disc reproduction assembly 2, and includes a horizontal guiding path 20 receiving the side end portions of each of disc trays 13–17 to ensure a horizontal travel, horizontal guiding paths 21 and 22 higher than horizontal guiding path 20 and expanding across the width of tray accommodating units 3 and 4 for receiving guide projections d and e of each of disc trays 13–17 to ensure a horizontal travel, and a flange 23 located at least above horizontal guiding path 20 and across the width of disc reproduction assembly 2 for preventing a disc tray traveling through horizontal guiding path 20 from floating upwards. Horizontal guiding paths 20, 21 and 22 and flange 23 are formed at the opposing faces of a pair of the support plates 19 disposed opposite to each other with a predetermined distance therebetween.

The vertical travel guiding member includes three inclined guiding grooves 24, 25 and 26, and an inclined block plane 27. Inclined guiding groove 24 (first inclined guiding path) has its upper end located at the boundary between horizontal guiding path 20 and each of horizontal guiding paths 21 and 22, and is inclined so that the distance to disc reproduction assembly 2 gradually increases in the downward direction. Inclined guiding groove 24 prevents the movement of joint 18 when disc trays 13–17 travel from disc reproduction assembly 2 to tray accommodating units 3 and 4, whereby the direction of travel is altered downwards. Inclined guiding grooves 25 and 26 (second inclined guiding path) has its upper end open at horizontal guiding paths 21 and 22, and extends parallel to inclined guiding groove 24. Guiding projections d and e of disc trays 13–17 fit into inclined guiding grooves 25 and 26. The tilt angle of inclined guiding grooves 25 and 26 is equal to that of the upper inclining face of guide projections d and e. Inclined blocking plane 27 prevents movement of guide projections d and e of disc trays 13–17 once they abut against disc trays 13–17 at a position matching inclined guiding grooves 25 and 26. Inclined guiding grooves 24, 25, 26 and inclined blocking plane 27 are inclined at a surface side facing the pair of support plates 19. Joint 18 includes a semicircular engaging portions p and q having a radius identical to that of columnar projections k and l at both side faces of inclined guiding groove 24, i.e. the portion abutting against the inclining face.

Travel of disc tray group 12 is carried out by a tray driving device 28 applying a driving force to a disc tray positioned at disc reproduction assembly 2. At one support plate 19, tray driving device 28 includes a reversible drive motor 30 mounted via an angle 29, a motor gear 31 attached to the shaft of drive motor 30, and a tray driving gear 32 supported between support plate 19 and angle 29 staying in mesh with both rack f of a disc tray and motor gear 31.

Prior to a detailed description of each of the above structure components, the travel operation of disc tray group 12 will be described schematically with reference to FIGS. 4–7.

Figure 4:
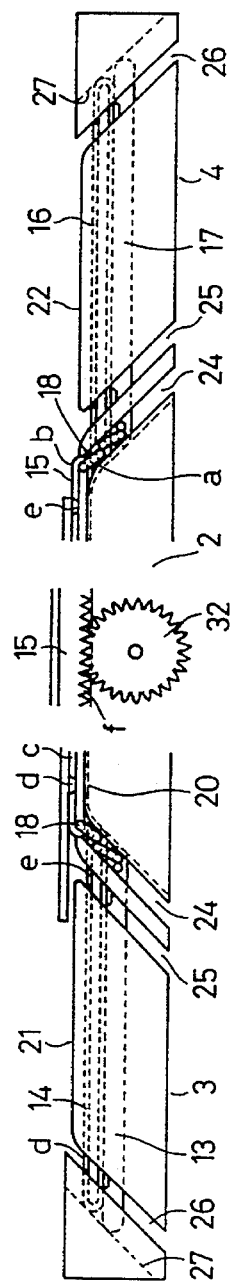
FIGS. 4, 5, 6 and 7 are partial broken sectional views viewed from the inner side of a support plate 19 for sequentially describing the change in the operation state of the components of the disc reproduction apparatus.

FIG. 4 shows the state where disc trays 13 and 14 are placed in tray accommodating unit 3, and disc trays 16 and 17 are placed in tray accommodating unit 4. Disc tray 15 is located in disc reproduction assembly 2. Under this state, the disc mounted on disc tray 15 can be reproduced.

When tray drive gear 32 begins to rotate clockwise in response to a driving force from drive motor 30, disc tray 15 having its rack f mesh with tray drive gear 32 is subject to a driving force rightwards to the drawing sheet. Disc tray 15 is subject to the action of horizontal guiding path 20 and flange 23 to travel rightwards while maintaining its horizontal state. This tray 15 is further subject to the action of guiding projection e and horizontal guiding path 22 and still maintains its horizontal travel. Here, joint 18 connecting disc trays 15 and 16 is fitted into inclined guiding groove 24 to have its movement blocked. Disc tray 15 travels horizontally by the sliding action between groove c and columnar projection k of joint 18.

By the rightward travel of disc tray 15, disc tray 14 connected to disc tray 15 via joint 18 and located top most of tray accommodating unit 3 is pulled up to horizontal guiding path 21. Disc tray 14 is subject to the action of horizontal guiding path 21 and guide projection d, and then the action of horizontal guiding path 20 and flange 23 to travel rightwards in a horizontal manner. In response to the elevation of disc tray 14, disc tray 13 in tray accommodating unit 3 is also elevated by one stage.

Figure 5:
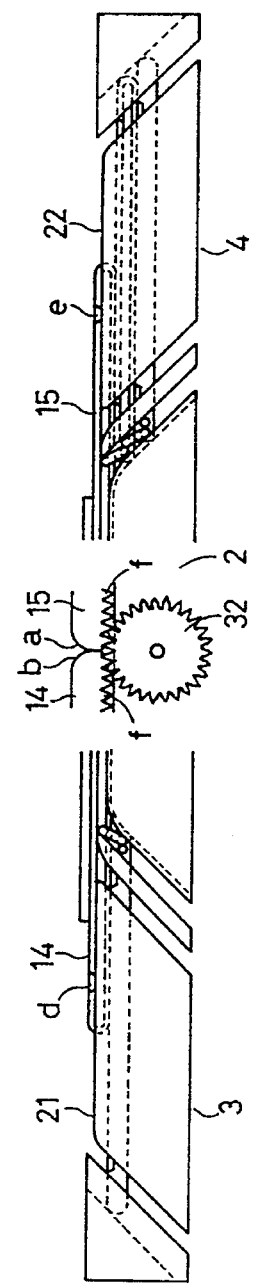

As disc trays 15 and 14 are horizontally conveyed rightwards, tray driving gear 32 is brought into mesh with rack f of disc tray 14 via the state shown in FIG. 5. The driving force of drive gear 32 is applied to disc tray 14, whereby disc tray 15 is urged rightwards due to the abutment between right semicircular face b of disc tray 14 and left semicircular face a of disc tray 15.

Figure 6:
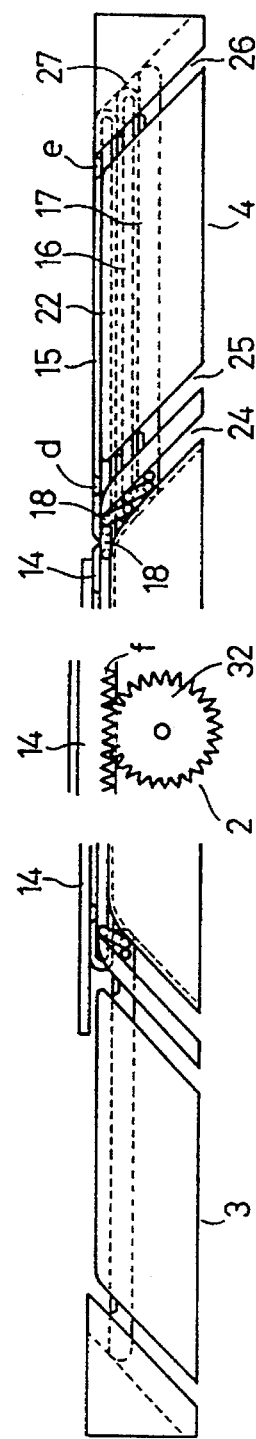

The horizontal travel of disc trays 14 and 15 continues until right semicircular face b of disc tray 15 abuts against inclined block plane 27 as shown in FIG. 6. Semicircular engaging portion q of Joint 18 connecting disc trays 14 and 15 abuts against semicircular engaging portion p of Joint 18 fitted into inclined guiding groove 24.

Figure 7:
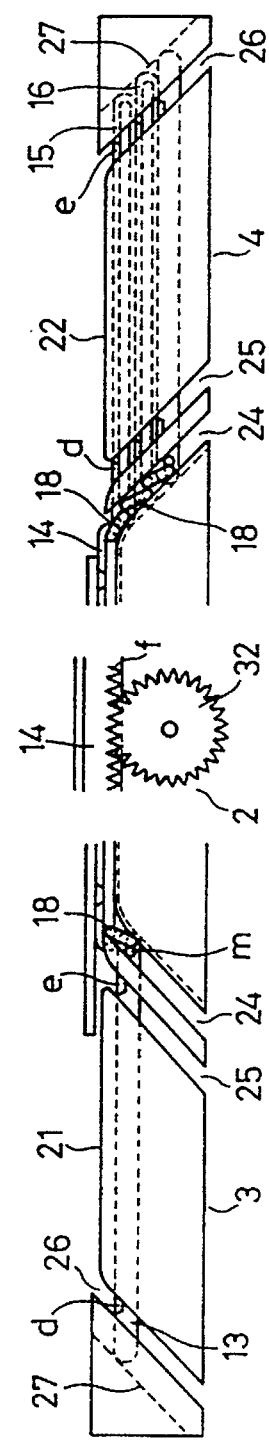

When disc tray 15 further receives a rightward driving force, the direction of the imparted driving force is altered due to the guiding action of the inclination of inclination blocking plane 27 and inclined guiding groove 24, and the offset in the abutment position of right semicircular face b and left semicircular face a. As a result, disc tray 15 is displaced in rotation to travel downwards without changing its position with respect to disc tray 14, as shown in FIG. 7. In response, disc trays 16 and 17 in tray accommodating unit 4 are lowered respectively by one stage.

If the travel of disc tray group 12 comes to a halt, disc tray 14 is located in a proper state in disc reproduction assembly 2. Thus, reproduction of the disc on disc tray 14 can be carried out.

If the disc on disc tray 13 is to be reproduced, drive motor 30 is continuously driven to carry out an operation similar to that described above. In this case, drive motor 30 is stopped when disc tray 13 is positioned in a proper state in disc reproduction assembly 2. When reproduction of a disc loaded on disc tray 16 or 17 is to be carried out, drive motor 30 is driven in a direction opposite to the previous rotation direction to carry out the above-described operation. As a result, disc trays 16 and 17 are sequentially positioned on disc reproduction assembly 2, so that reproduction of the disc loaded thereon can be carried out.

By moving disc tray group 12 in the tray connected direction, the five disc trays 13–17 can be positioned selectively in disc reproduction assembly 2. In other words, by loading respective disc in discs trays 13–17, a desired disc can be selected out of the 5 discs for reproduction.

Each component in the disc reproduction apparatus of the present invention will be described in detail hereinafter.

Figure 8:
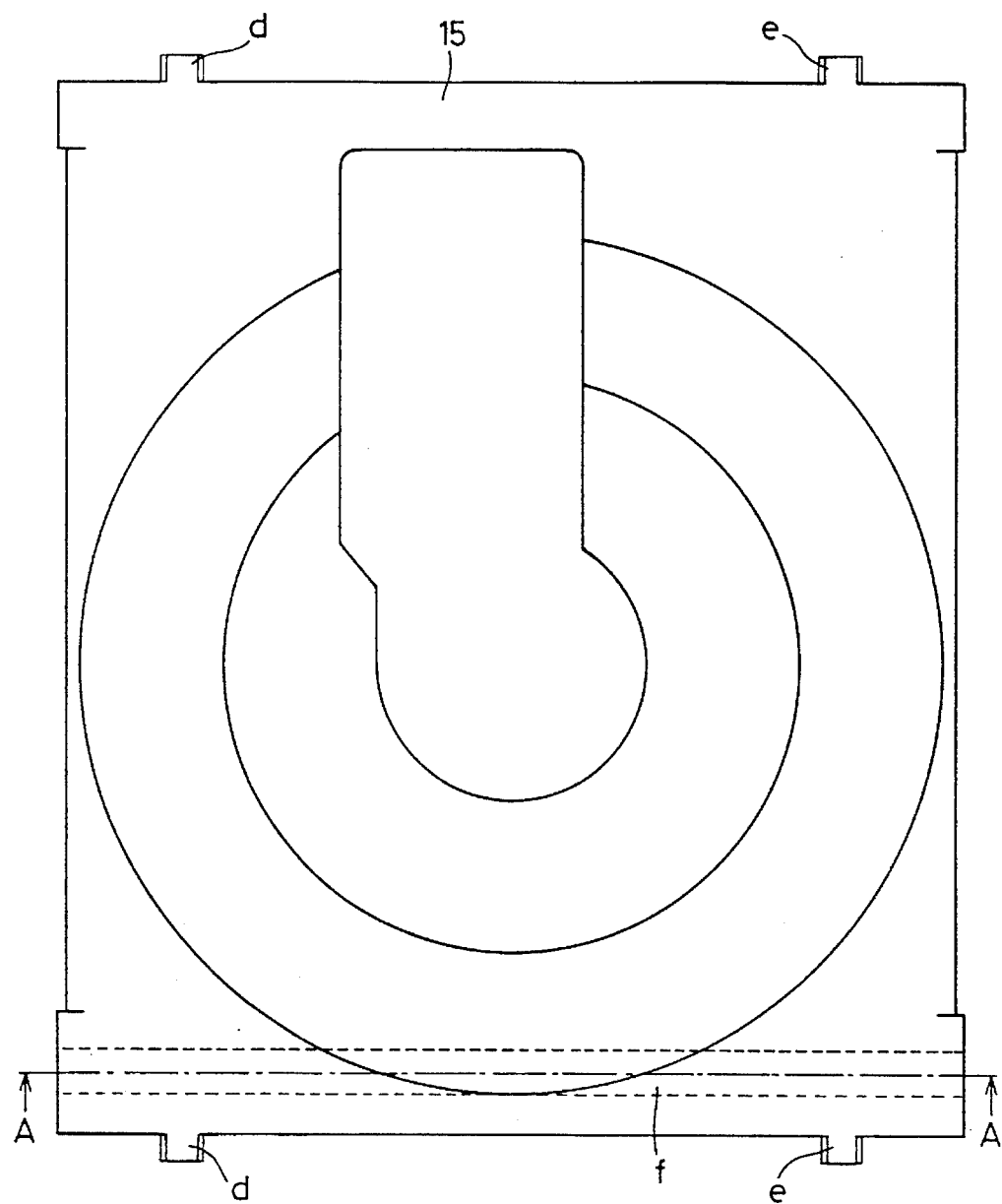
FIG. 8 is a plan view of a disc tray in the disc reproduction apparatus.

The relationship between disc trays 13–17 and rack f will be described with reference to FIGS. 8 and 9. Although the disc tray shown in FIG. 8 is denoted with a reference character of 15 for the sake of convenience, other disc trays 13, 14, 16 and 17 have a similar structure.

Figure 9A:
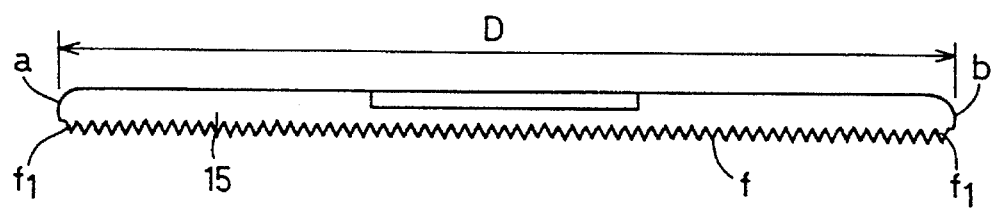
FIG. 9A is a sectional view taken along line A—A in FIG. 8.
Figure 9B:
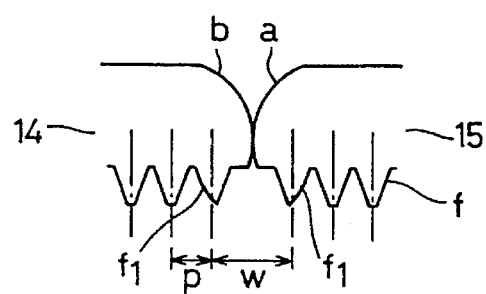
FIG. 9B is an enlarged sectional view taken along line A—A of FIG. 8 in the proximity of the connection of two adjacent disc trays 14 and 15.

As mentioned above, a rack f extending in the connected direction (travel direction) is formed at the back side of disc tray 15. Referring to FIG. 9A, the tip of each tooth f1 at either side of rack f has a tapered edge. By setting the width D in the travel direction of disc tray 15 to approximately an integral multiple of m×π where m is the module of rack f and π the circular constant, the distance w between respective tooth f1 of adjacent disc trays having a width of D and abutting each other naturally becomes an integral multiple of m×π, as shown in FIG. 9B. In the present embodiment, the distance w between one tooth f1 of a disc tray and tooth f1 of an adjacent disc tray is set to two times p (m×π).

Therefore, the transition operation of tray drive gear 32 in mesh with rack f of disc tray 15 to come into mesh with rack f of disc tray 14 (particularly refer to FIG. 5) can be carried out reliably and smoothly.

The pitch of columnar projections k and l of joint 18 must be set to minimize the gap between adjacent disc trays. This is to prevent a disc from protruding out between neighboring disc trays in placing disc trays 13–17 into tray accommodating units 3 and 4, and to minimize the vertical dimension of tray accommodating units 3 and 4 for reducing the size of the apparatus, or to increase the number of discs that can be stored in the disc trays (i.e. the loadable number of discs). The method of setting the pitch of columnar projections k and l will be described hereinafter with reference to FIGS. 10A and 10B.

Figure 10A:
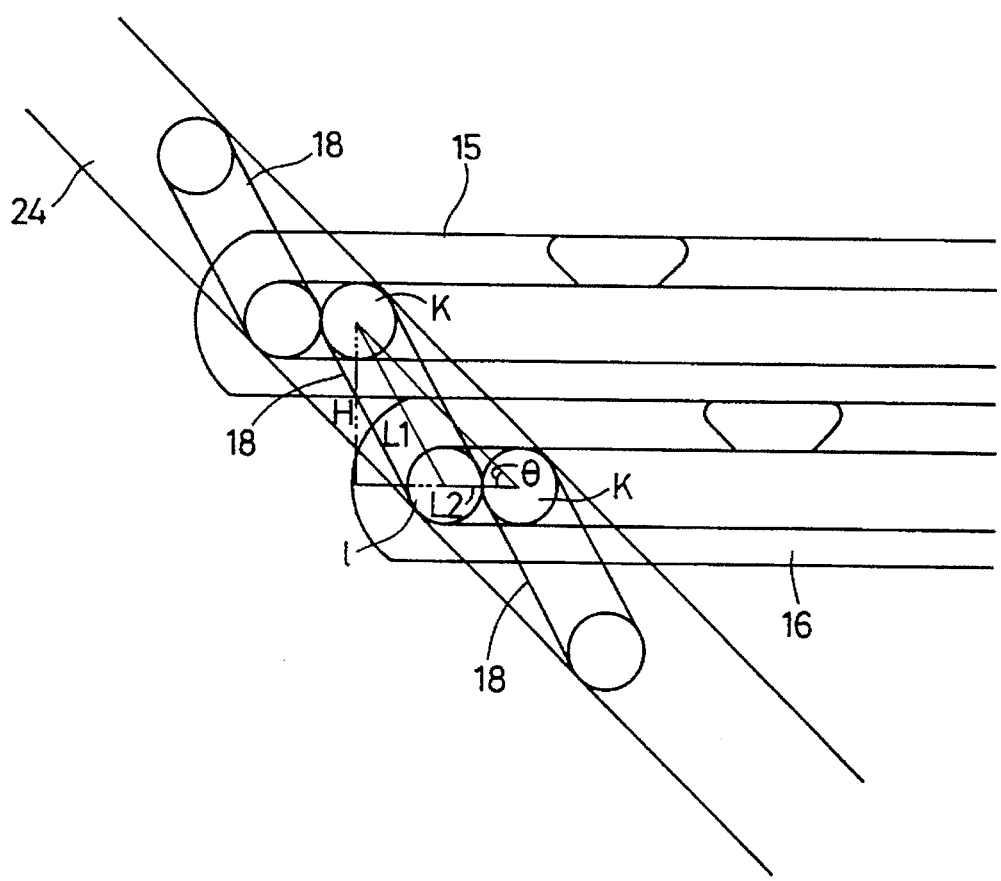
FIG. 10A is an enlarged view in the proximity of the left end of disc trays 15 and 16 in a vertically stacked up position for describing the dimension relation between a joint and a disc tray.
Figure 10B:
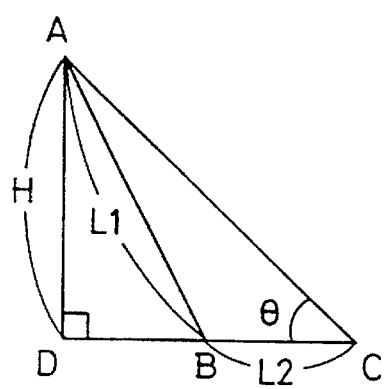
FIG. 10B is an enlarged diagram of a triangle used for deriving an equation for dimension calculation.

Assuming that the pitch of columnar projections k and l of joint 18 is L1, the diameter of columnar projection k and l is L2, the pitch (matches the thickness of each disc tray) between disc trays 13–17 stacked up with no gap is H, and the inclination angle of inclined guiding groove 24 into which joint 18 is fitted is θ, a triangle shown in FIG. 10A is obtained in which the base is L2, one of the remaining two sides is L1, and the angle between the base and the other remaining side is θ. This triangle denoted as ABC is enlarged and shown in FIG. 10B. Assuming that the foot of a perpendicular drawn from a vertex A to the bottom side BC in triangle ABC is D, the length of side AD is identical to H. Because the length of side DC is expressed as H/tan θ and the length of side DB is expressed as H/tan θ–L2, the pitch L1 between columnar projections k and l of joint 18 can be obtained by the following equation of (1) by applying the Pythagorean theorem to a right-angle triangle.

$$L1=\{H^2+(H/\tan\theta-L2)^2\}^{1/2} \tag{1}$$

By setting the value obtained by equation (1) as the pitch L1 between columnar projections k and l of joint 18, the gap between respective disc trays 13–17 becomes 0. Therefore the vertical dimension of each of disc accommodating units 3 and 4 can be minimized. In practice, it is desirable to set pitch L1 slightly greater than the value obtained by equation (1) in order to carry out smoothly the relative sliding operation and rotating operation of disc trays 13–17 (one disc tray rotatably moving into a vertical direction without altering its upright orientation with respect to the other disc tray).

Figure 2:
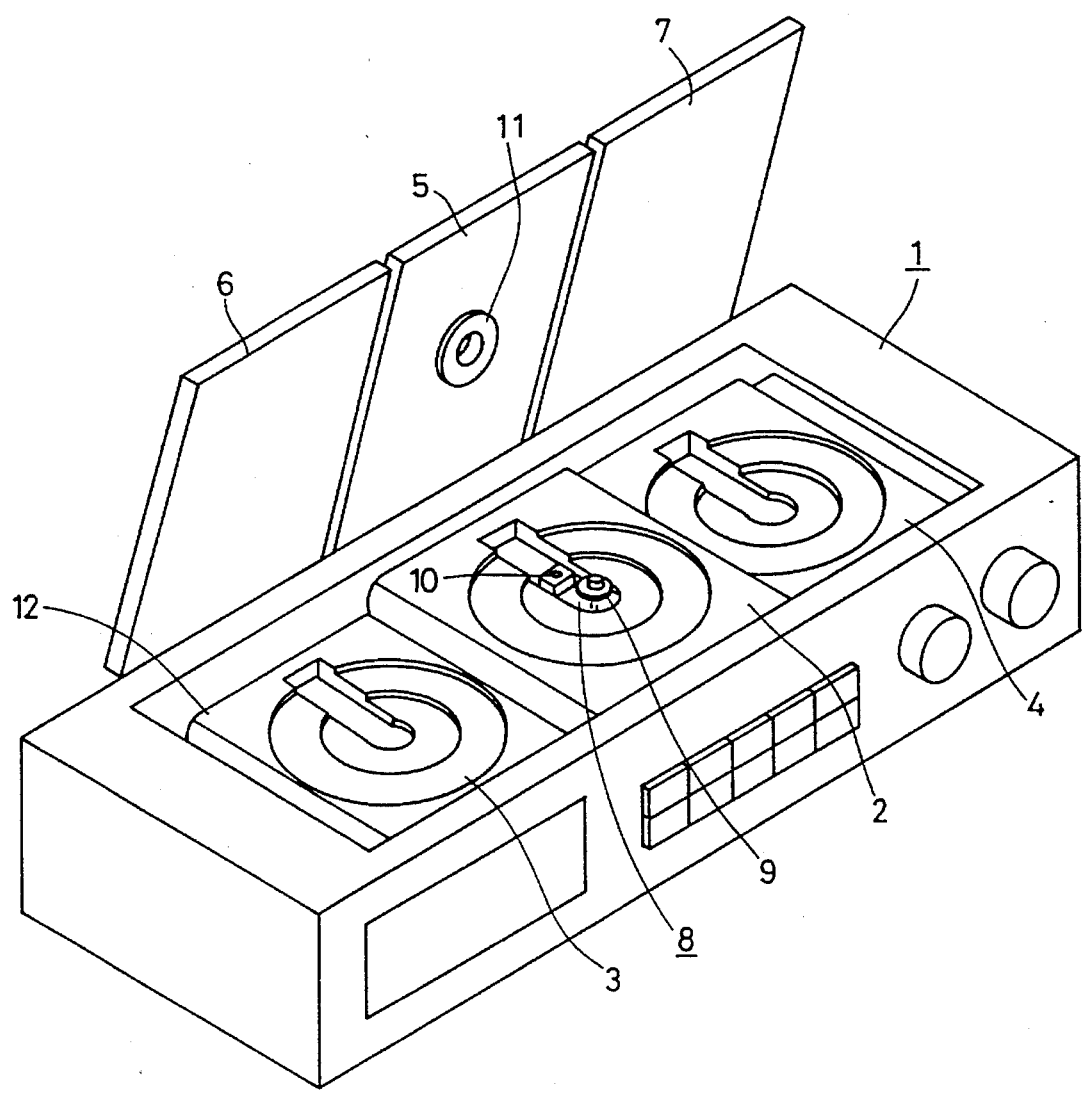
FIG. 2 is an exploded perspective view of the main parts of the disc reproduction apparatus.
Figure 3:
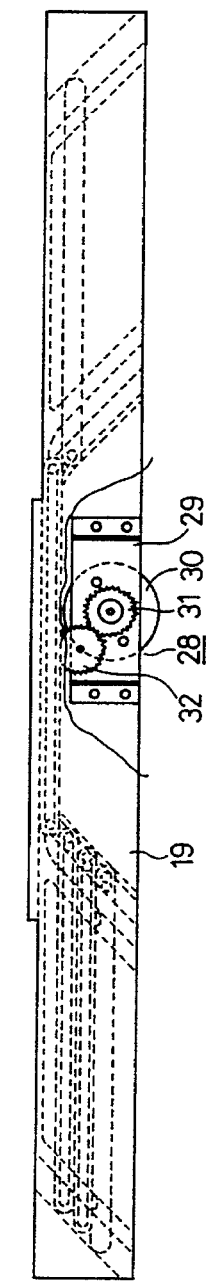
FIG. 3 is a partial broken front view of the disc reproduction apparatus viewed from outside a supporting plate 19.
Figure 12:
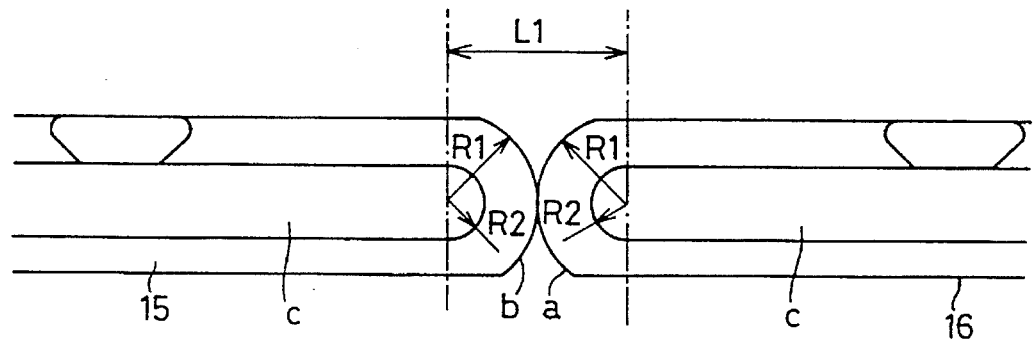
FIG. 12 is a diagram showing an abutted state of midsectional disc trays in the disc reproduction apparatus.

The relationship between each joint and a disc tray will be described with reference to FIGS. 11 and 12. Although the disc trays in FIG. 2 are denoted with the reference characters of 15 and 16 for the sake of description, a similar structure applies for disc tray 14.

The pitch between columnar projections k and l of joint 18 is L1 (as described above, slightly greater than the value obtained from equation (1)), and the diameter of columnar projections k and l is L2. Semicircular engaging portions p and q have a radius of L2/2. The width of groove c of disc trays 15 and 16 is set to be slightly greater than diameter L2 of columnar projections k and l that will be fitted into groove c. Both ends of groove c is formed to have a semicircular shape of a radius $R_2$. Radius $R_2$ is substantially equal to the radius of columnar projections k and l.

Thus, the pitch between the centers of the end semicircular face of groove c of adjacent disc trays 15 and 16 is substantially equal to pitch L1 of joint 18. Radius R1 of a right semicircular face b and a left semicircular face a of disc trays 15 and 16 abutted against each other is set to half the pitch of L1 of joint 18. The center thereof is made to be consistent with the center of the semicircular shape of groove c.

According to the above-described structure, a right semicircular face b of disc tray 14 and a left semicircular face a of disc tray 15 will always maintain a line contacting state when disc tray 15 transits from a horizontal travel to an oblique downward travel, as shown in FIGS. 6 and 7. Therefore, a smooth transient of the direction of travel can be carried out with no jolting. Furthermore, disc tray 15 can move smoothly from a horizontal travel to an oblique downward travel due to the horizontal urge force of disc tray 14 exerted on disc tray 15 by the function of left and right semicircular faces a and b as a downward oblique force.

Figure 13:
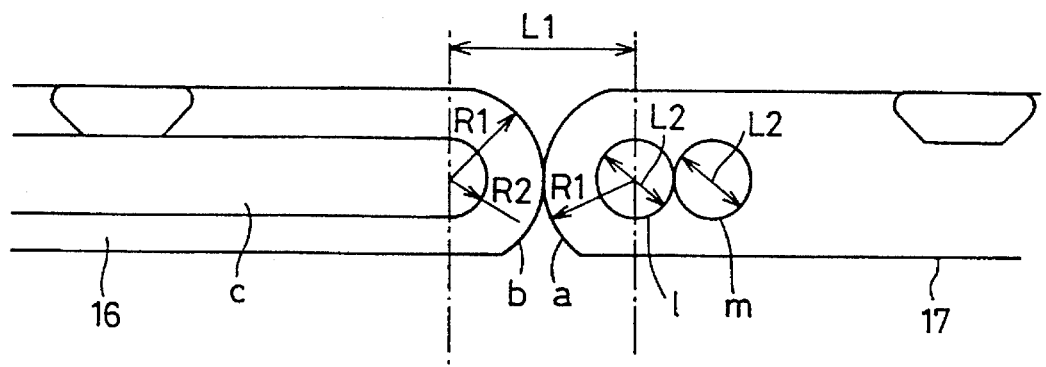
FIG. 13 is a diagram for describing the abutting means of an intermediate disc tray and one of the side disc trays in the disc reproduction apparatus.

FIG. 13 shows an abutment between one inner disc tray and one of the side disc trays of the disc tray group. Referring to FIG. 13, disc tray 17 positioned at the end of disc tray group 12 has a left semicircular face a with a radius R1 identical to right semicircular face b of inner disc tray 16. The center of this left semicircular face a is consistent with the center of columnar projection 1 of joint 18. In disc tray 17, columnar engaging projection m has a diameter L2 identical to that of columnar projection 1 of an adjacent joint 18.

The width in the horizontal direction of inclined guiding grooves 24–26 in tray accommodating units 3 and 4 are set as follows. The width in the horizontal direction of inclined guiding groove 24 into which semicircular engaging portions p and q of joint 18 fits for engagement is set to the diameter of semicircular engaging portions p and q of joint 18, i.e. substantially two times the diameter L2 of columnar projections k and l. Therefore, a semicircular engaging portion p of one joint 18 and a semicircular engaging portion q of the other joint 18 will come into horizontal level in inclined guiding groove 24, so that unstability of the disc trays in the vertical position is prevented by the abutment between both semicircular engaging portions p, q and either side face of inclined guiding groove 24.

Also, unstability of disc trays in the vertical direction is prevented by the abutment between the sides of each of guide projections d and e and the side faces of inclined guiding grooves 25 and 26 on account of the horizontal width of inclined guide grooves 25 and 26 being substantially equal to the width of guide projections d and e.

Each of disc trays 13–17 moves vertically while maintaining its horizontal state in tray accommodating units 3 and 4 by means of joint 18 and the function between respective guide projections d and e and respective inclined guiding grooves 24–26. Therefore, a disc can be loaded and held in a stable state without particular measures.

Figure 14:
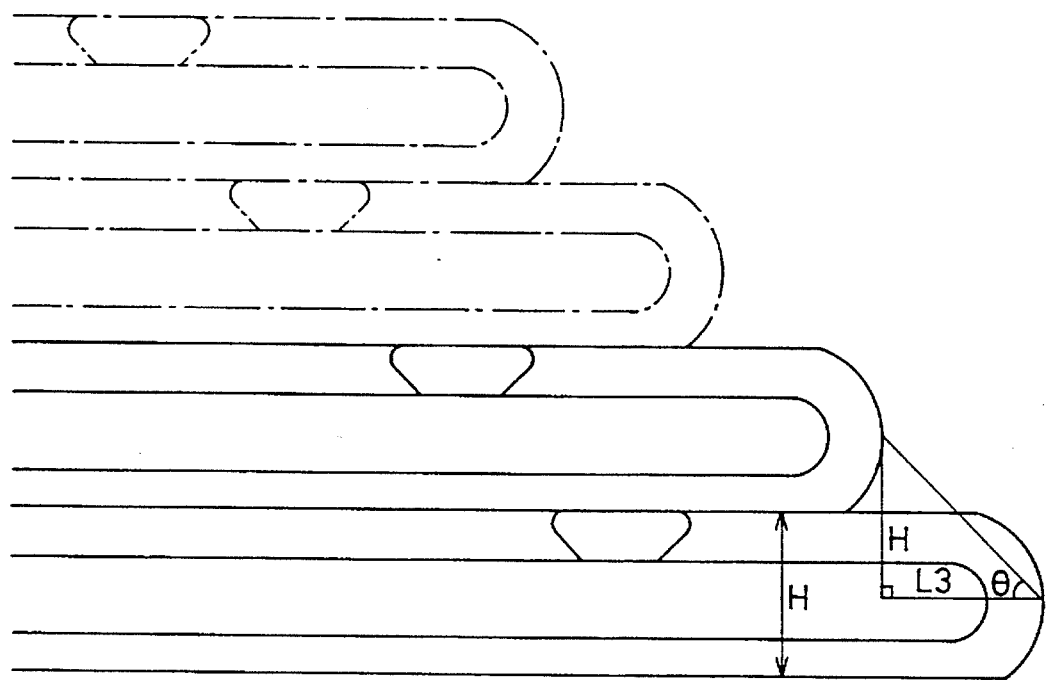
FIG. 14 is a diagram for describing the relationship between increase in the number of disc trays and increase in the size in the disc reproduction apparatus.

Increase in the dimension of a disc reproduction apparatus incorporating a disc changer according to the present invention will be described in accordance with increase in the loadable number of discs in conjunction with FIG. 14.

Assuming that the thickness of a disc tray is H (equal to the pitch between disc trays in accommodation), the inclination angle is θ, and the increase in the size of the apparatus in the right side direction (viewed towards the drawing sheet) in response to increase of the number of disc trays is L3, a right triangle having two sides (lengths H and L3) at right angles with each other is obtained. The side having a length of H is opposite an angle of θ to the remaining one side in the right-angle triangular. Therefore, L3=H/tan θ. Because a tray accommodating unit is located at either side of the apparatus, the lateral width of the apparatus increases two times L3 for each increase of a disc. The increase in height is H.

When the thickness H of a disc tray is 6.5 mm, and the inclination angle θ is 45°, for example, the apparatus is increased by 13 mm laterally and 6.5 mm in height per increase of one disc. Therefore, the loadable number of discs can be increased without unduly increasing the size of the apparatus.

Figure 15:
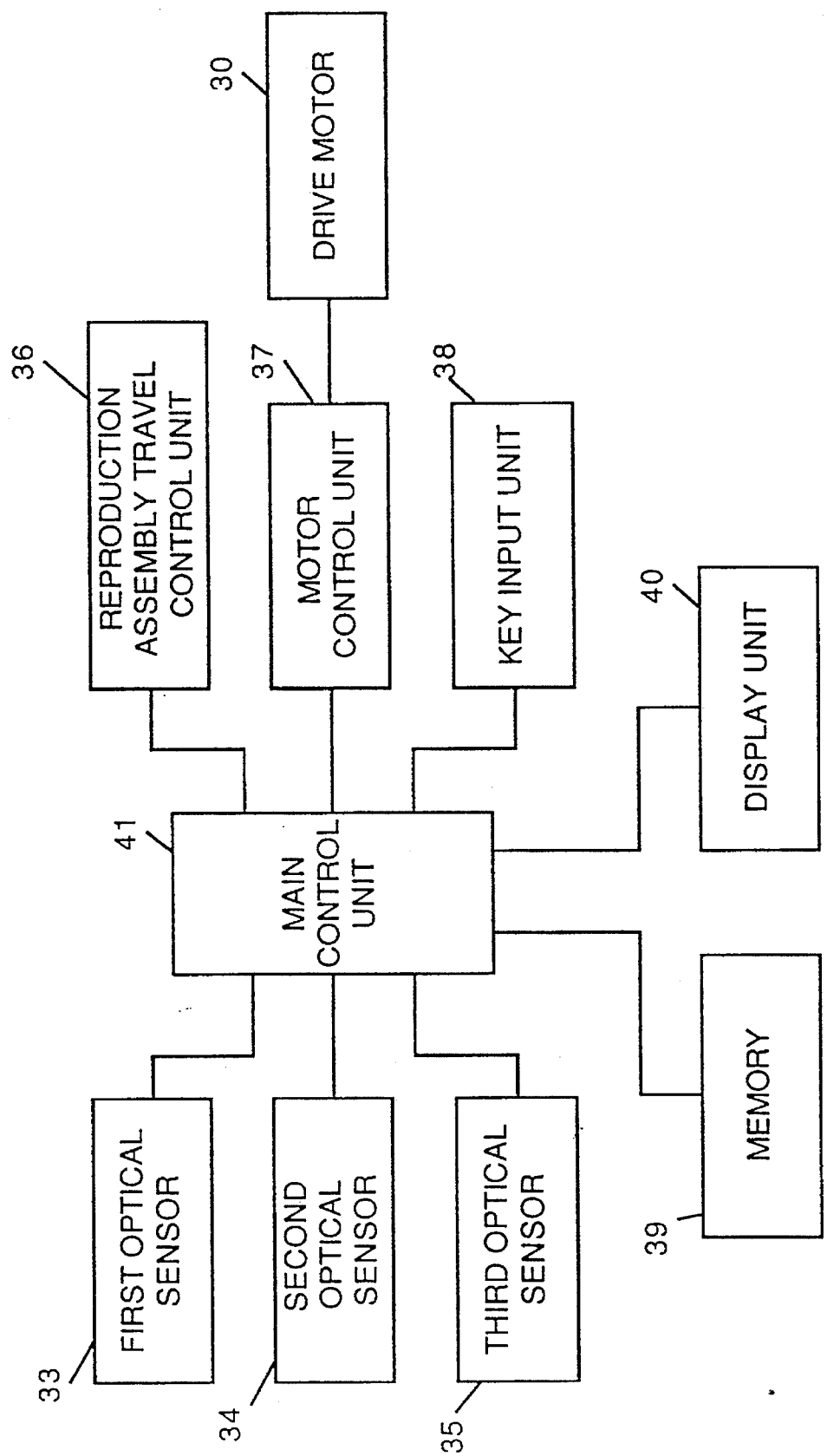
FIG. 15 is a block diagram of the control system of a disc changer in the disc reproduction apparatus.
Figure 16:
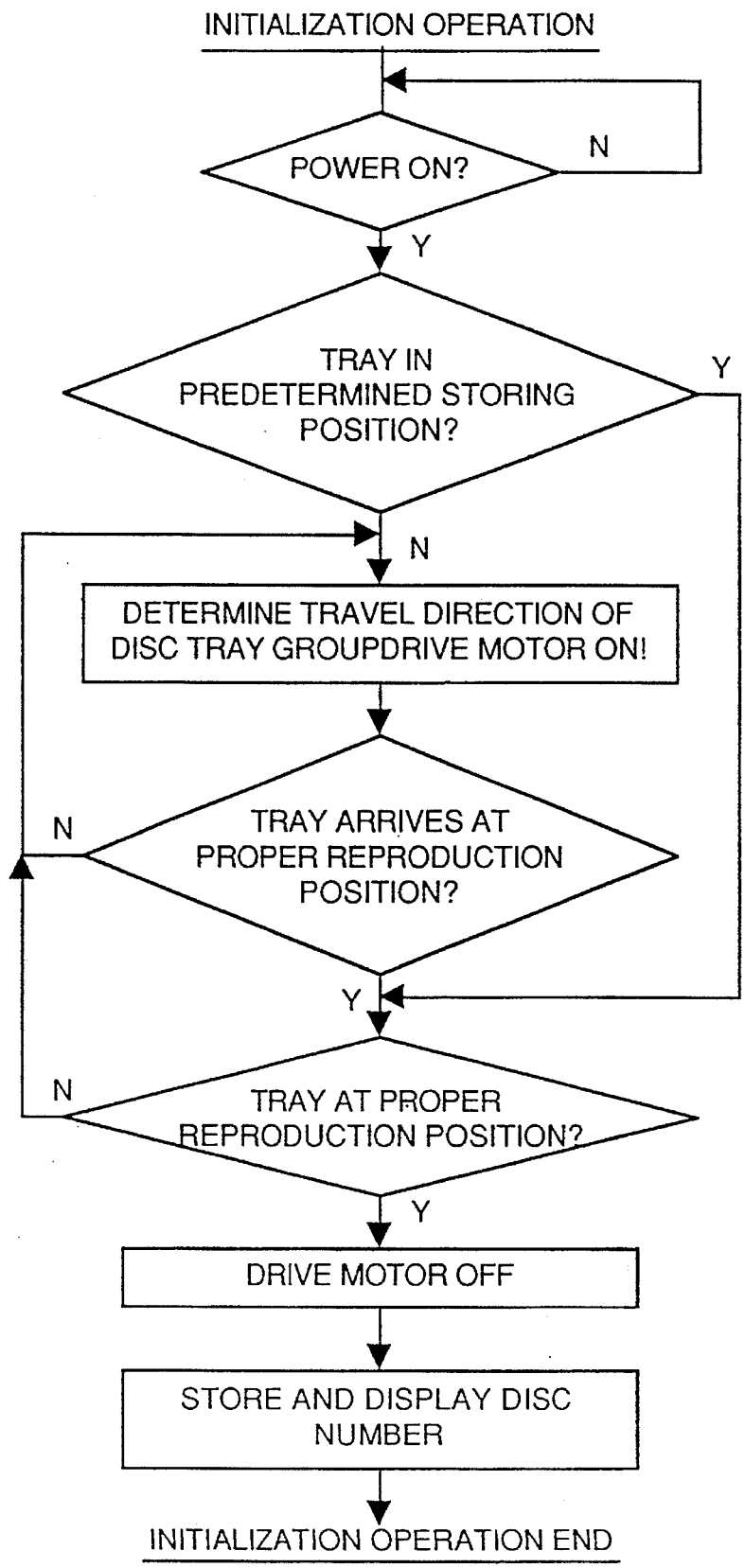
FIG. 16 is a flow chart showing the initialization operation in the disc reproduction apparatus.
Figure 17:
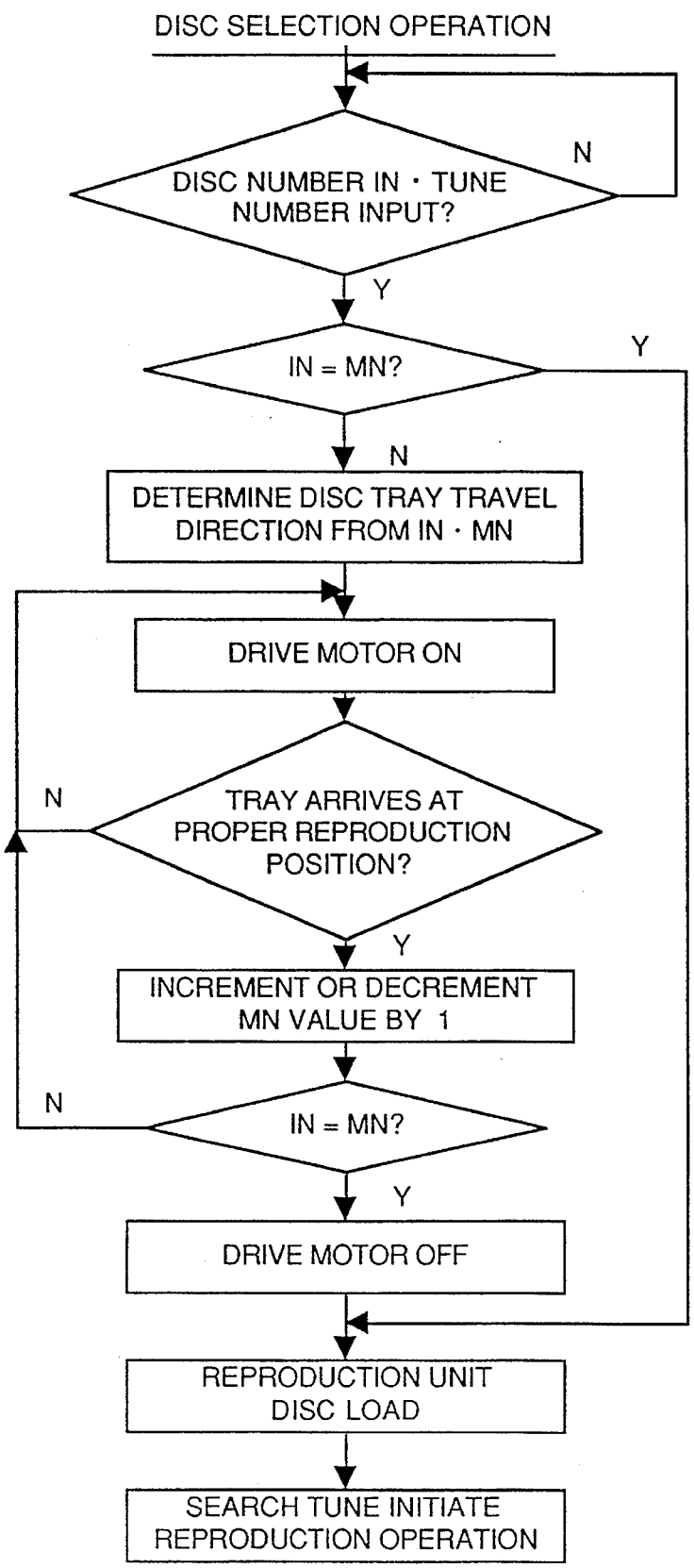
FIG. 17 is a flow chart for describing a disc selection operation in the disc reproduction apparatus.

The control system of the disc changer according to the present embodiment will be described hereinafter with reference to FIG. 15.

The control system of the present invention includes a first optical sensor 33 for detecting the proper positioning of a relevant disc tray 13–17 in disc reproduction assembly 2, and second and third optical sensors for detecting the presence of a disc tray at the second stage in tray accommodating units 3 and 4. First optical sensor 33 includes a light emitting element and a light receiving element. A light reflecting region is provided at a predetermined position at the back side of each of disc trays 13–17. The relationship among the light reflecting region, the light emitting element and the light receiving element is set so that when an appropriate one of disc trays 13–17 comes to the proper positioned in disc reproduction assembly 2, light from the light emitting element is reflected by the light reflecting region to enter the light receiving element. The second and third optical sensors 34 and 35 have a structure similar to that of the first optical sensor 33, and detects the arrival of disc tray 13 at the bottom stage using the light reflecting region.

The control system of the present invention further includes a reproduction unit travel control unit 63 for driving the vertical travel mechanism of reproduction unit 8, a motor control unit 37 for controlling driver motor 30, a key input unit 38 for specifying a disc or a tune to be reproduced, a memory 39 for storing various data for control, a display unit 40, and a main control unit 41 for controlling each element in reproduction unit travel control unit 36 and motor control unit 37 according to an instruction signal from key input unit 38 and a detection signal from each of optical sensors 33–35.

The operation in turning on the control system of the present invention will be described hereinafter with reference to the flow chart of FIG. 16 and FIGS. 4–7.

Upon detecting power on, main control unit 41 proceeds to the next step to make determination whether there is a disc tray 13 or 17 at the second stage of tray accommodating units 3 or 4 according to output signals from second and third optical sensors 34 and 35.

If each disc tray is currently located as in FIG. 4 where disc trays 13 and 17 are placed at its second stage of tray accommodating units 3 and 4, main control unit 41 detects the presence of the disc tray at the second stage of respective tray accommodating units 3 and 4 by output signals of second and third optical sensors 34 and 35. Then, detection is made that disc tray 15 is located at the proper position in disc reproduction assembly 2 according to an output signal from first optical sensor 33, whereby the initialization state of disc tray group 12 is determined.

Then, main control unit 41 stores into memory 39 a disc number MN loaded in disc tray 15 positioned at disc reproduction assembly 2, and displays the same at display unit 40. Thus, the initialization operation is completed.

For the sake of simplification, the number of a disc loaded in each of disc trays 13–17 is referred to as the first disc, the second disc, . . . corresponding to the ascending reference characters of the disc trays. Therefore, the disc number of "3" is stored in memory 39 or displayed at display unit 40 when the above-described initialization operation ends.

If each disc tray is located as in FIG. 7 where disc tray 13 is positioned at the top most stage of tray accommodating unit 3, and disc trays 15–17 are positioned from the top most to the third stage, respectively, in tray accommodating unit 4. Therefore, main control unit 41 detects that there is no disk tray at the second stage in tray accommodating unit 3 according to output signals of second and third optical sensors 34 and 35.

Then, main control unit 41 provides an instruction signal to motor control unit 37 so that drive motor 30 is rotatably driven to move disc tray group 12 leftwards (to the drawing sheet). As a result, the second disc tray 14 is horizontally transported leftwards and the third disc tray 15 in tray accommodating unit 4 is lifted by one stage. Therefore, disc trays 14 and 15 travel horizontally in the left direction. Disc trays 16 and 17 at the second and third stages in tray accommodating unit 4 are elevated respectively by one stage.

The horizontal travel of disc trays 14 and 15 continues until left semicircular face a of disc tray 14 abuts against inclined blocking plane 27, and semicircular engaging portion p of joint 18 connecting disc trays 14 and 15 abuts against semicircular engaging portion q of joint 18 located already in inclined guiding groove 24. The travel of disc tray 14 shifts from a horizontal travel to an oblique downward travel.

This oblique downward travel is carried out by the guiding function of inclined blocking plane 27, inclined guiding groove 24, joint 18, and also inclined guiding grooves 25 and 26, and guide projections d, e. This guide function causes disc tray 14 to be lowered while maintaining a horizontal state, whereby the first disc tray 14 at the top most stage descends to the second stage. This state is shown in FIG. 4.

When disc tray group 12 attains the state shown in FIG. 4, main control unit 41 will recognized that an initialization state is attained by an operation similar to the above description. In response, an instruction signal is provided to motor control unit 37 to stop drive motor 30. Also, the number of the disc tray is stored in memory 39 and the disc number is displayed in display unit 40.

Thus, an initialization operation is executed when the power is turned on. By the initialization operation, the state of disc tray group 12, i.e. the position of each disc tray 13–17 is identified to determine the rotation drive direction of drive motor 30 on the basis of determination result. Therefore, disc tray group 12 is driven leftwards or rightwards. This causes disc tray group 12 to attain the initialization state. More specifically, an operation is carried out so that the third disc tray 15 is positioned at disc reproduction assembly 2, and two disc trays are located in respective disc accommodation units 3 and 4.

Reproduction operation will be described hereinafter with reference to the flow chart of FIG. 17, and FIGS. 4–7.

When a disc number and a tune number are entered via key input unit 38, main control unit 41 stores into memory 39 the entered disc number and tune number, and compares the entered disc number IN with the disc number MN positioned at the reproduction position stored in memory 39.

When the disc number MN stored in memory 39 is "3" and the currently entered disc number IN is "3", the comparison will result in a match in the initialization state. In response, main control unit 41 provides an instruction signal to reproduction unit travel control unit 36. As a result, reproduction unit 8 is moved upwards, the disc is lifted up from disc tray 15 by turntable 9, and sandwiched between turntable 9 and stabilizer 11 to be held stably. Then, a conventionally well known operation of searching for the specified tune is carried out to shift into a reproduction operation.

If the disc number IN entered by key input unit 38 is, for example "5", the comparison with disc number MN stored in memory 39 results in a mismatch. Main control unit 41 determines the travel direction of disc tray group 12 according to disc number MN stored in memory 39 and the input disc number IN. Based on to this determination, an instruction signal is provided to motor control unit 37 to drive rotatably in a predetermined direction drive motor 30.

In the above-described case, disc tray group 12 is moved leftwards to the drawing sheet from the state of FIG. 4. During this travel, main control unit 41 repetitively monitors whether disc tray 17 has come to the proper position in disc reproduction assembly 2 according to an output signal of first optical sensor 33. This operation will be described hereinafter.

Main control unit 41 detects the offset of disc tray 15 from the proper position when disc tray group 12 begins to move. When detection of disc tray 16 arriving at the proper position is made, the value of disc number MN stored in memory 39 is updated to "4" from "3". The updated value and the entered disc number IN is compared. In the current case, the comparison results in a mismatch, so that main control unit 41 continues the drive of drive motor 30. Therefore, disc tray group 12 further moves leftwards.

When disc tray 17 reaches the proper position in disc reproduction assembly 2, the value of disc number MN is updated to "5" from "4", whereby the comparison with disc number IN results in a match. In response, main control unit 41 provides an instruction signal to motor control unit 37 to stop drive motor 30. Then, the disc on disc tray 17 is sandwiched by turntable 9 and stabilizer 11 to shift to a reproduction operation.

Every time a disc number is entered by key input unit 38, the above-described operation is repeated on the basis on disc number MN stored in memory 39, whereby a disc tray having the disc of the entered disc number loaded is selectively conveyed to the proper position in disc reproduction unit 2 for reproduction.

Although the above embodiment was described in which disc tray 15 placed at the proper position of disc reproduction assembly 2 is the initialization state of disc tray group 12 wherein the initialization state is detected by three optical sensors, the initialization state may be set to the state where disc tray 13 is located at the proper position of disc reproduction unit 2. The manner of the initialization state, the type of sensors, the detection method, or the like are not limited to those in the above-described embodiment.

Figure 18:
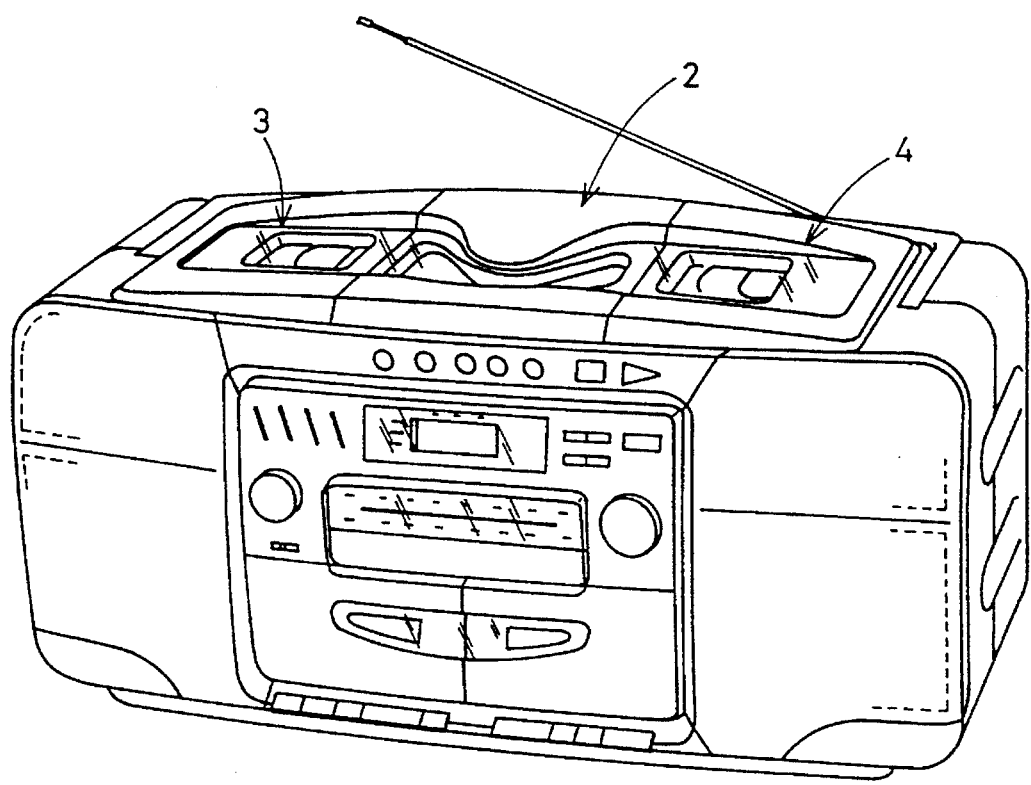
FIG. 18 shows a disc reproduction apparatus according to an embodiment of the present invention assembled in a portable radio cassette tape recorder.

The incorporation of a disc reproduction apparatus including a disc changer of the above embodiment into a radio cassette tape recorder is as shown in FIG. 18.

The present invention is not limited to the embodiment of the foregoing description and illustration. It is to be understood that the horizontal travel guiding means, the vertical travel guiding means or the like of the disc tray group may be embodied in various forms without departing from the spirit and scope of the invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc reproduction apparatus comprising:
   an apparatus main body including a disc reproduction assembly for reproducing a disc and two tray accommodating units, alternate ones of said two tray accommodating units being positioned at either side of said disc reproduction assembly;
   a disc tray group of a plurality of disc trays sequentially connected in series so that adjacent disc trays are relatively rotatable and slidable with each other;
   joints connecting said adjacent disc trays of said plurality of disc trays, each of said joints being supplied with a pair of shaft portions, wherein a first shaft portion of said pair of shaft portions of each of said joints is attached to a disc tray of said plurality of disc trays and a second shaft portion of said pair of shaft portions of each of said joints is attached to an adjacent disc tray of said adjacent disc trays of said plurality of disc trays;

disc tray driving means for moving said disc tray group in a direction of the connected disc trays; and tray travel guiding means for guiding the travel of each disc tray to position a desired disc tray in said disc reproduction assembly and remaining disc trays in said two tray accommodating units when said disc tray group is made to travel by said disc tray driving means, 2. The disc reproduction apparatus according to claim 1, wherein said tray travel guiding means comprises:

horizontal travel guiding means for moving each disc tray of said plurality of disc trays horizontally in response to said disc tray driving means while maintaining a horizontal state between the tray accommodating units located so as to sandwich the disc reproduction assembly, and vertical travel guiding means for moving each disc tray of said plurality of disc trays vertically in response to said disc tray driving means while maintaining said horizontal state in a tray accommodating unit.

3. The disc reproduction apparatus according to claim 2, wherein said vertical travel guiding means comprises an inclined guiding path inclined so that the distance to said disc reproduction assembly gradually increases from an upper end towards a lower end of said inclined guiding path, whereby said disc tray conveyed from said disc reproduction assembly to one of said two tray accommodating units by said horizontal travel guiding means is moved obliquely downwards.

4. The disc reproduction apparatus according to claim 1, wherein said tray driving means applies a driving force to said disc tray positioned in said disc reproduction assembly to move said disc tray group.

5. The disc reproduction apparatus according to claim 2, wherein said vertical travel guiding means comprises a first inclined guiding path having an upper end located at a boundary point of said disc reproduction assembly and said tray accommodating unit to regulate a movement of said joint when said disc tray is conveyed from said disc reproduction assembly to said tray accommodating unit for changing the travel direction of said joint downwards for guiding a downward travel, and a second inclined guiding path spaced apart from said boundary and provided parallel to said first inclined guiding path, and into which a guiding projection contributing to the horizontal travel of said disc tray is fitted.

6. The disc reproduction apparatus according to claim 5, wherein said first and second inclined guiding path have a groove configuration, the width in the horizontal direction of said first inclined guiding path is set to approximately two times the diameter of a columnar engaging portion of said joint fitted into said first and second inclined guiding paths, and the width in the horizontal direction of said second inclined guiding path is set substantially equal to the width of said guiding projection of said disc tray, said disc tray positioned at an upper end of said disc tray is provided with an engaging projection adjacent to said semicircular engaging portion of said joint, and having a diameter substantially equal to that of said semicircular engaging portion.

7. The disc reproduction apparatus according to claim 1, further comprising a first opening and closing means for opening and closing an upper face of said disc reproduction assembly and a second and a third opening and closing means for opening and closing respective upper faces of said two tray accommodating units.

8. The disc reproduction apparatus according to claim 1, wherein at least each inner disc tray of said disc tray group has on its side face a groove extending in a travel direction for receiving said first shaft portion of a first joint connected with a first adjacent disc tray and said second shaft portion of a second joint connected with a second adjacent disc tray.

9. The disc reproduction apparatus according to claim 1, wherein each end portion of each of said disc trays has a semicircular face in a travel direction thereof and, during movement across said disc reproduction assembly, adjacent semicircular faces of said adjacent disc trays are brought into contact with each other.

10. The disc reproduction apparatus as recited in claim 9, wherein said pair of shaft portions has a pitch substantially equal to the diameter of said semicircular face.

11. The disc reproduction apparatus according to claim 8, wherein each end portion of each of said disc trays has a semicircular face in a travel direction thereof and, during movement across said disc reproduction assembly, adjacent semicircular faces of said adjacent disc trays are brought into contact with each other.

12. The disc reproduction apparatus as recited in claim 11, wherein said pair of shaft portions has a pitch substantially equal to the diameter of said semicircular faces.

13. The disc reproduction apparatus as recited in claim 1, wherein said disk tray driving means comprises a single drive mechanism.

14. A disc reproduction apparatus comprising:

an apparatus main body including a disc reproduction assembly for reproducing a disc and two tray accommodating units, alternate ones of said two tray accommodating units being positioned at either side of said disc reproduction assembly;

a plurality of disc trays for loading said disc;

joints connecting adjacent disc trays of said plurality of disc trays, each of said joints being supplied with a pair of shaft portions, wherein a first shaft portion of said pair of shaft portions of each of said joints is attached to a disc tray of said plurality of disc trays and a second shaft portion of said pair of shaft portions of each of said joints is attached to an adjacent disc tray of said adjacent disc trays of said plurality of disc trays; and tray driving means for moving said plurality of disc trays between said two tray accommodating units via said disc reproduction assembly, and selectively positioning a disc tray in said disc reproduction assembly, wherein, as said disc tray positioned in said disc reproduction assembly travels in a direction towards one of said two tray accommodating units, a disc tray of said plurality of disc trays next in order in the other of said two tray accommodating units is moved to said disc reproduction assembly.

15. The disc reproduction apparatus according to claim 14, wherein said two tray accommodating units store said plurality of disc trays vertically in a sequential stacked manner, send an upmost disc tray to said disc reproduction assembly, and store the disc tray from said disc reproduction assembly at a top most stage thereof.

16. A disc reproduction apparatus comprising:

an apparatus main body including a disc reproduction assembly for reproducing a disc and two tray accommodating units, alternate ones of said two tray accommodating unit being positioned at each side of said disc reproduction assembly;

a plurality of disc trays for loading said disc;

joints connecting adjacent disc trays of said plurality of disc trays, each of said joints being supplied with a pair of shaft portions, wherein a first shaft portion of said pair of shaft portions of each of said joints is attached to a disc tray of said plurality of disc trays and a second shaft portion of said pair of shaft portions of each of said joints is attached to an adjacent disc tray of said adjacent disc trays of said plurality of disc trays; and tray driving means for conveying, via said disc reproduction assembly, said plurality of disc trays between said two tray accommodating units located on either side of said disc reproduction assembly, and positioning a desired disc tray in said disc reproduction assembly, wherein, as a disc tray at a top most position in one of said two tray accommodating units travels to said disc reproduction assembly, a disc tray next in order in said one of said two disc tray accommodating units is lifted up to the top most position during operation of said tray driving means.

17. A disc reproduction apparatus comprising:

an apparatus main body including a disc reproduction assembly for reproducing a disc, and two tray accommodating units, alternate ones of said two tray accommodating units being positioned at each side of said disc reproduction assembly;

a plurality of disc trays for loading said disc;

joints connecting adjacent disc trays of said plurality of disc trays, each of said joints being supplied with a pair of shaft portions, wherein a first shaft portion of said pair of shaft portions of each of said joints is attached to a disc tray of said plurality of disc trays and a second shaft portion of said pair of shaft portions of each of said joints is attached to an adjacent disc tray of said adjacent disc tray of said plurality of disc trays; and tray driving means for conveying, via said disc reproduction assembly, said plurality of disc trays between said two tray accommodating units, and positioning a desired disc tray in said disc reproduction assembly, wherein each of said disc trays is always in contact with at least one adjacent disc tray of said adjacent disc trays, travels while maintaining its horizontal state, and is accommodated in a stacked manner in said tray accommodating unit.

* * * * *